US012037958B1

(12) United States Patent
Kumar et al.

(10) Patent No.: US 12,037,958 B1
(45) Date of Patent: Jul. 16, 2024

(54) METHOD AND APPARATUS FOR PROGRAMMING A THROTTLE BODY

(71) Applicant: RB Distribution Inc., Colmar, PA (US)

(72) Inventors: Sagar Kumar, Bensalem, PA (US); Venkataramanikumar Thoppebremkumar, Chalfont, PA (US); Matthew Dale Caton, Macungie, PA (US)

(73) Assignee: RB DISTRIBUTION, INC., Colmar, PA (US)

( * ) Notice: Subject to any disclaimer, the term of this patent is extended or adjusted under 35 U.S.C. 154(b) by 0 days.

(21) Appl. No.: 18/350,216

(22) Filed: Jul. 11, 2023

(51) Int. Cl.
*B60T 7/12* (2006.01)
*F02D 41/24* (2006.01)
*F02D 41/28* (2006.01)

(52) U.S. Cl.
CPC ......... *F02D 41/2487* (2013.01); *F02D 41/28* (2013.01)

(58) Field of Classification Search
CPC .................. G07C 5/008; G07C 5/0808; F02D 2200/0404; F02D 2009/0235; F02D 2009/0296; H04L 12/40; H04L 2012/40273
USPC .......................................................... 701/103
See application file for complete search history.

(56) References Cited

U.S. PATENT DOCUMENTS 5,864,297 A 1/1999 Sollestre et al.
5,937,065 A 8/1999 Simon et al.
5,950,597 A * 9/1999 Kamio .................. F02D 41/222 123/399
5,983,860 A * 11/1999 Kitamura ............... G01B 21/00 123/399
6,225,898 B1 5/2001 Kamiya et al.
6,377,173 B1 4/2002 Desai
6,899,080 B2 * 5/2005 Pursifull .................. G05B 9/03 123/399
6,941,203 B2 9/2005 Chen
7,125,238 B2 10/2006 Reutter et al.
7,315,238 B2 1/2008 Chambers et al.
8,466,774 B2 6/2013 Lopez et al.
8,626,331 B2 1/2014 Marsh et al.
8,634,951 B2 1/2014 Freeman
(Continued)

FOREIGN PATENT DOCUMENTS

WO 2009010919 A2 1/2009

OTHER PUBLICATIONS

Advanced Diagnostics USA. (Sep. 6, 2013), World Leader in Transponder Key Programming-mvptcodesupport. Retrieved from https://web.archive.org/web/20130906051317/http://www.mvptcodesupport.com/, pp. 1-2.
(Continued)

*Primary Examiner* — Long T Tran
*Assistant Examiner* — James J Kim
(74) *Attorney, Agent, or Firm* — Volpe Koenig

(57) ABSTRACT

A dongle for setting the position of a throttle plate in a throttle body has a process that is driven by a power supply regulated to 5 Vdc to generates a graphic representation of an acceptable range for engine revolutions per minute and throttle plate position within a throttle body. A comparator extracted information from an interrogation of the engine control monitor to determine if the throttle body is within the acceptable range. A signal is generated to indicates the presence or absence of an acceptable range.

16 Claims, 4 Drawing Sheets

(56) References Cited

U.S. PATENT DOCUMENTS

| | | | |
|---|---|---|---|
| 8,682,468 | B2 | 3/2014 | Marsh et al. |
| 8,841,987 | B1 | 9/2014 | Stanfield et al. |
| 8,841,988 | B2 | 9/2014 | Summerford et al. |
| 8,880,274 | B2 | 11/2014 | Chenn |
| 8,979,446 | B2 | 3/2015 | Freeman |
| 9,384,604 | B1 * | 7/2016 | Manoukis ............ G07C 5/0858 |
| 9,792,735 | B2 * | 10/2017 | Elliott .................... G07C 5/008 |
| 2004/0122542 | A1 | 6/2004 | Yang |
| 2004/0230356 | A1 | 11/2004 | Namaky |
| 2005/0126270 | A1 * | 6/2005 | Shao ...................... G01D 5/165 73/114.37 |
| 2005/0177284 | A1 | 8/2005 | Kugumiya et al. |
| 2005/0248436 | A1 | 11/2005 | Hohmann et al. |
| 2006/0101311 | A1 | 5/2006 | Lipscomb et al. |
| 2006/0208069 | A1 | 9/2006 | Gilbert et al. |
| 2007/0001805 | A1 | 1/2007 | Utter et al. |
| 2007/0046425 | A1 | 3/2007 | Booth |
| 2007/0073458 | A1 | 3/2007 | Webster et al. |
| 2007/0296559 | A1 | 12/2007 | Fehr |
| 2008/0122594 | A1 | 5/2008 | Brecht et al. |
| 2008/0150685 | A1 | 6/2008 | Desai et al. |
| 2008/0319665 | A1 | 12/2008 | Berkobin et al. |
| 2009/0150118 | A1 | 6/2009 | Naima |
| 2009/0160607 | A1 | 6/2009 | Edwards et al. |
| 2009/0276115 | A1 | 11/2009 | Chen |
| 2009/0278656 | A1 | 11/2009 | Lopez et al. |
| 2010/0205450 | A1 | 8/2010 | Sarnacke et al. |
| 2010/0293081 | A1 | 11/2010 | Liu et al. |
| 2011/0035461 | A1 | 2/2011 | Sodergren et al. |
| 2011/0084807 | A1 | 4/2011 | Logan et al. |
| 2011/0288954 | A1 | 11/2011 | Bertosa et al. |
| 2012/0330498 | A1 | 12/2012 | Nagara et al. |
| 2013/0141212 | A1 | 6/2013 | Pickering |
| 2013/0146376 | A1 | 6/2013 | Nam et al. |
| 2013/0204485 | A1 | 8/2013 | Chen et al. |
| 2013/0282229 | A1 | 10/2013 | Wittliff, III et al. |
| 2014/0104771 | A1 | 4/2014 | Colan |
| 2015/0187147 | A1 | 7/2015 | Tieman |
| 2015/0310675 | A1 | 10/2015 | Park |
| 2016/0084657 | A1 | 3/2016 | Schilling et al. |
| 2016/0086390 | A1 | 3/2016 | Berkobin |
| 2016/0171802 | A1 | 6/2016 | Fountain |
| 2022/0012956 | A1 * | 1/2022 | Fiello ..................... G07C 5/008 |

OTHER PUBLICATIONS

Product Literature, Keyless Remote Program, 2013.
Garrido, “Ford PCM Programming: The Other Procedures,” May 1, 2011, Search Autoparts, http://www.searchautoparts.com/motorage/technicians/scope-scan-service-repair/ford-pcm-programming-other-procedures.
Cardone Industries, “How to Reprogram a Ford PCM,”Jun. 26, 2015, https://www.youtube.com/watch?v=Y_3hQI0VivQ.

* cited by examiner

METHOD AND APPARATUS FOR PROGRAMMING A THROTTLE BODY

BACKGROUND

With the ever increasing demand for greater engine fuel economy without a loss in performance, there has been an increased use in computerized controls for fuel injection systems. Typical fuel injections systems do not utilize traditional carburetors and have substituted throttle bodies for the functions previously performed by carburetors.

The throttle body contains the throttle valve or throttle plate that is responsive to accelerator pedal movement. The throttle valve regulates the amount of air that gets introduced into the engine. The fuel injectors spray atomized fuel into the intake of each cylinder in response to an electrical signal from the engine control module (ECM), also known as an engine control unit (ECU). One of the factors for determining the amount of fuel injected is the position of the throttle valve determined by the throttle position sensor (TPS).

The TPS interacts with the ECU to communicate the position of the throttle plate and/or the shaft supporting the throttle plate. Replacing or repairing the throttle body can result in misalignment of the throttle plate and/or support shaft. This condition can also result from replacement of the ECU. This misalignment can result from a number of factors including, but not limited to, manufacturing tolerances, high idle settings, and/or large engine sizes.

When a vehicle has been running with an ill performing throttle body, it is possible that the ECU may have made intermittent adjustments over time. This can result from small particle or carbon build up. As a result of these events, the stored information may not reflect the manufacturer's preferred operating ranges for the throttle setting or the RPMs for a newly installed throttle body.

While there are known devices for electronically adjusting the throttle valve in the throttle body, they often do not consider the requirement of optimizing operations to the manufacturer's preferred operating ranges. Furthermore, the known devices are generally expensive and not readily available to the small shop mechanic or do-it-yourself (DIY) mechanic. Therefore, an improved device and method for establishing the throttle body position is desired.

SUMMARY

The disclosed device is presented as a dongle that is mated to the vehicle through the onboard diagnostic port-II (OBD-II). The device provides the ability to achieving electronic accuracy while avoiding the expense of known electronic systems or the possible inaccuracies of manual attempts to make the adjustments.

A summary of the operation is as follows. Turn the ignition on without turning the engine on. Check that all accessories are off and insert the programming dongle. Wait for a solid green light and an audible beep. Turn the engine on at an idle. The throttle position values will be compared and a setting in range will be indicated by a solid green light and an audible beep indicating that the programming dongle can then be removed. The above sequence can be repeated a needed; however, the failure to achieve a reading in an acceptable range is a likely indicator that the repair or installation should be checked for the cause of the repeated failures.

DETAILED DESCRIPTION

The throttle body programmer will be described in more detail with reference to the drawings wherein the same or similar elements are identified with the same indicator.

All automotive vehicles built for sale in the United States after 1996 are required to be OBD-II compliant for the transmission of electronic information into and within the vehicle system. There are five OBD-II protocol types in use: J1850 PWM, J1850 VPW, ISO 9141-2, ISO 14230 KWP2000, and ISO 15765 CAN. Each protocol differs electrically and by communication format. Accordingly, a programming dongle must be compatible with the vehicle's specific protocol in order to communicate with the OBD-II in the vehicle.

Figure 1:
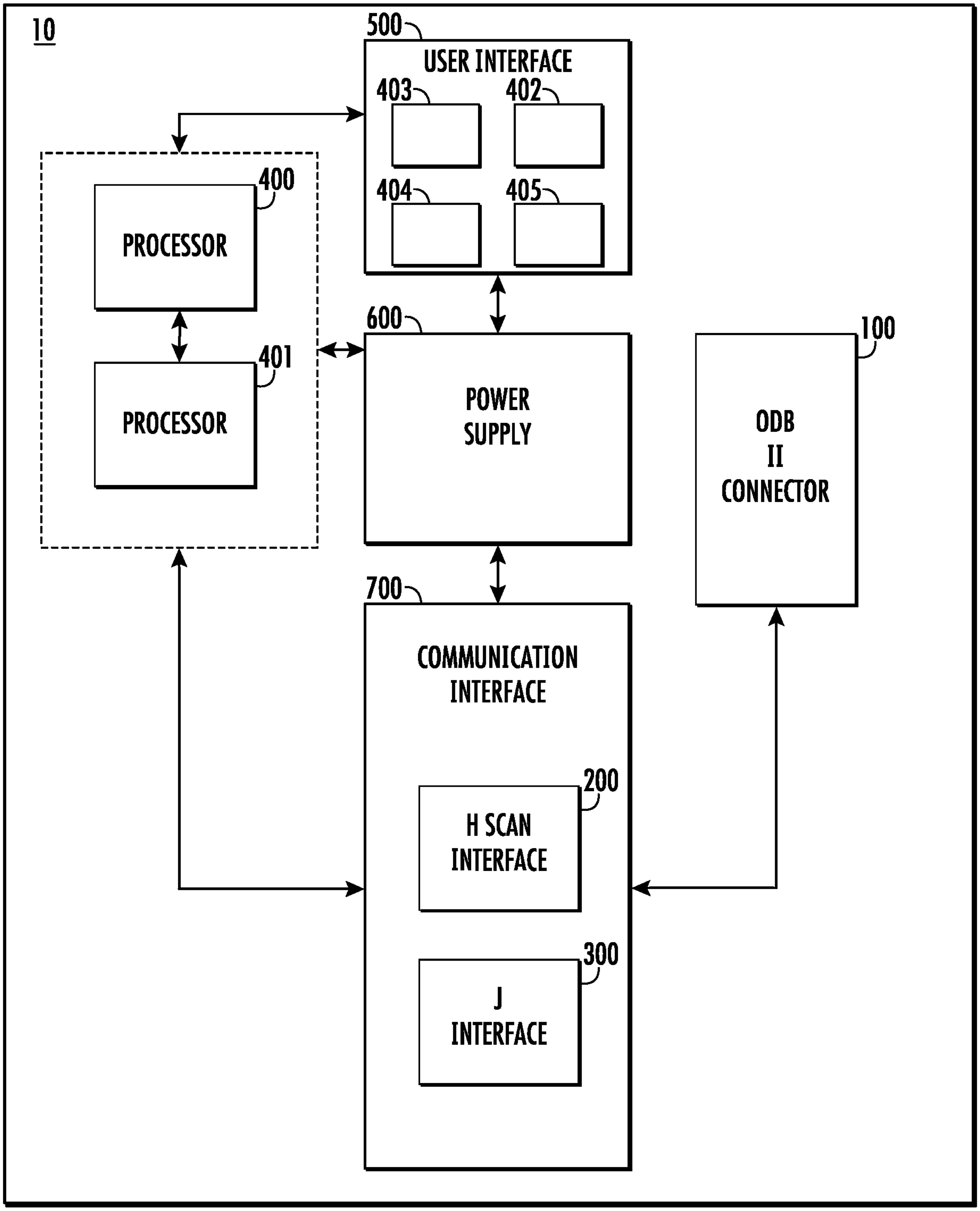
FIG. 1 is an illustrative block diagram of a dongle the connecter and the internal electronics; and, FIGS. 2A through 2C present a flow chart of the procedure for programming a throttle body.

The programming dongle 10 in FIG. 1, has a processor or microcontroller 400 in communication with memory 401, user interface 500, power supply 600, communication interface 700, and a compliant OBD-II connector 100. Communication interface 700 may include one or more interfaces to support multiple communication protocols, for example the multiple OBD-II protocols. As shown, in an illustrative embodiment, a first communication interface 200 is a High Speed Control Area Network (HSCAN) interface and a second communication interface 300 is a J1850 interface. The J1850 developed from two proprietary protocols, which are alternative J1850 protocols: 41.6 Kb/s with pulse width modulation and 10.6 Kb/s with variable pulse width. Programming dongle 10 can thus operate with the respective protocol for the vehicle to which it is connected. Different vehicles used one interface or the other in the past but the HSCAN interface is the more common interface for newer vehicles. Thus, the programming dongle 10 may have multiple communication systems so it is able to transmit and receive in accordance with standard communication protocols developed for onboard diagnostics (OBD) systems such as ISO15765-4 CAN (Both High Speed and Single Wire CAN), ISO 9141-2 (K-Line), KW2000 and J1850 (Both VPW and PWM variations). Dongle 10 can enter the particular mode to initiate communications with the vehicle's electronics via the appropriate protocol.

User interface 500 may include one or more of an LED 402 for providing a visual indication of the status of dongle 10 to a user, a speaker 403 to broadcast an audible signal when the programming dongle 10 is ready for user interaction, a screen 404 to provide user instructions or indicators, and one or more input mechanisms such as keys or buttons 405 for a user to interact with the dongle 10.

The power supply 600 is powered by a 5 Vdc voltage regulator and regulated to 5 Vdc to drive the microcontroller 400. Power is provided by the OBD-II connection to the vehicle. The microcontroller or processor 400 is responsible for operating based on vehicle identification and specifications to set the throttle plate position.

The powertrain control module (PCM) of the vehicle (not shown), manages the engine, transmission and other systems based on information it receives from various sensors around the vehicle. The PCM receives signals from sensors that measure air flow into the engine and out the exhaust, the coolant temperature, how much the accelerator pedal is depressed, the speed at which each wheel is turning and other parameters. The PCM makes dozens of decisions per second, such as how much fuel to inject into each cylinder, when to fire the spark plugs and when an automatic transmission should shift to a different gear to deliver the best performance for the current conditions. When this flow of information between the PCM and other onboard computers and sensors is uninterrupted and works properly, the result is smooth and efficient performance with the PCM seamlessly making necessary changes. When there is an interruption, such as repairing or replacing a throttle body, the vehicle may not respond appropriately when the accelerator is depressed.

To assure proper performance, the information regarding the position of the throttle body must be provided to the PCM. The PCM is provided the position of the throttle body through the throttle body programmer verifying when the throttle body is set according to the manufacturer's specification. An exemplary verification process is provided below for a General Motors vehicle after 2008.

Throttle Position is checked when the engine is operating at idle, the throttle position must be watched to determine if the test passes or fails depending on the minimum and maximum values. An example of the available data related to throttle position follows; however, some of Byte data available is not used. The exemplary information is contained in CAN which generates a request for throttle position data and checks the throttle position value against a set value for the vehicle.

Command Message:

| Header | Byte1 | Byte2 | Byte3 | Byte4 | Byte5 | Byte6 | Byte7 | Byte8 |
|---|---|---|---|---|---|---|---|---|
| 3D1 | 0xB1 | 0xB2 | 0xXX | 0xXX | 0xXX | 0xXX | 0xXX | 0xXX |
| Bit7 | Bit6 | Bit5 | Bit4 | Bit3 | Bit2 | Bit1 | Bit0 | |
| 0 or 1 | X | X | X | X | X | X | X | |

The Engine Speed RPM message is CAN ID C9:

| Header | Byte1 | Byte2 | Byte3 | Byte4 | Byte5 | Byte6 | Byte7 | Byte8 |
|---|---|---|---|---|---|---|---|---|
| C9 | 0xXX | 0xB2 | 0xB3 | 0xXX | 0xXX | 0xXX | 0xXX | 0xXX |

The Engine Speed RPM and Throttle Positions messages, in some vehicles, are in CAN ID 110, C9, or 3D1 CAN messages.

| Header | Byte1 | Byte2 | Byte3 | Byte4 | Byte5 | Byte6 | Byte7 | Byte8 |
|---|---|---|---|---|---|---|---|---|
| 110 | 0xXX | 0xB2 | 0xB3 | 0xXX | 0xXX | 0xB6 | 0xXX | 0xXX |

Using the throttle position CAN message, the processor 400 compares the bit for throttle position to check its validity, and compares it to the throttle position set value. The message data byte for the throttle position will be converted into a percentage value. For example, if B1=0×23, the throttle position is 13.7%. The engine speed RPM message is CAN ID which uses 16-bit data or two bytes. These bytes are converted by the processor 400 into the RPM value. The calculated RPM is the decimal value of 16 bit×0.25. For example, if the value is 0xAAD is 2733, then the RPM is calculated as 0.25×273+683.25 RPM.

Figure 2A:
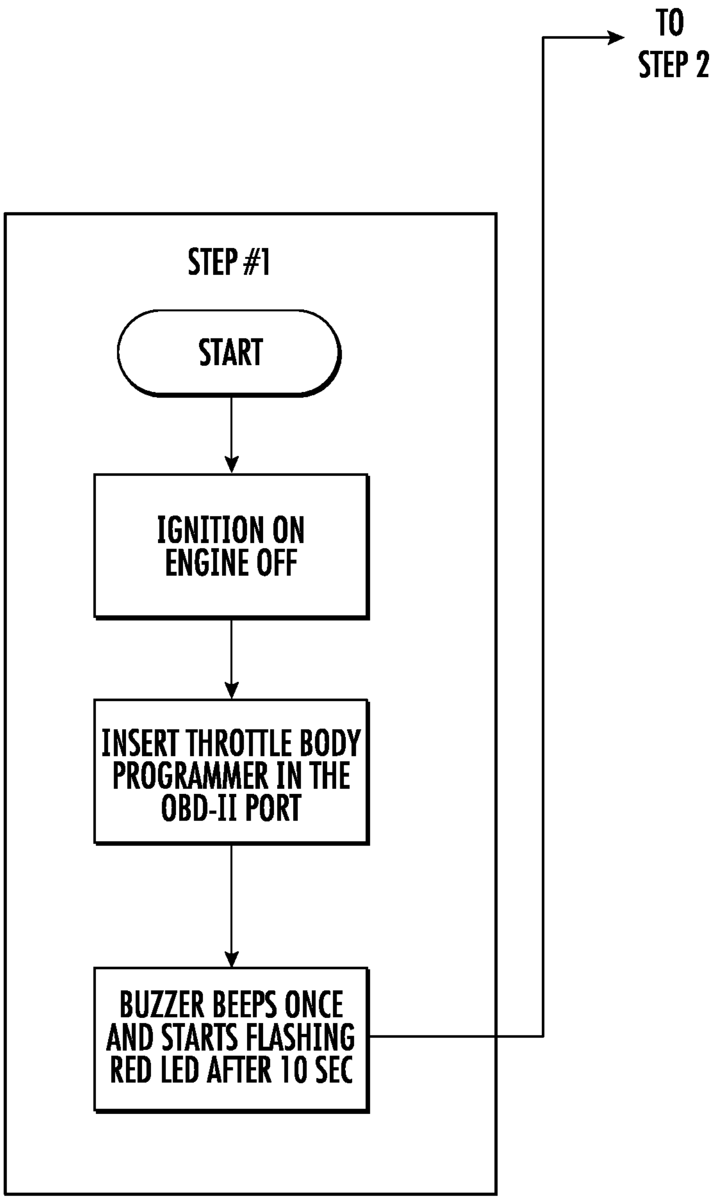
Figure 2B:
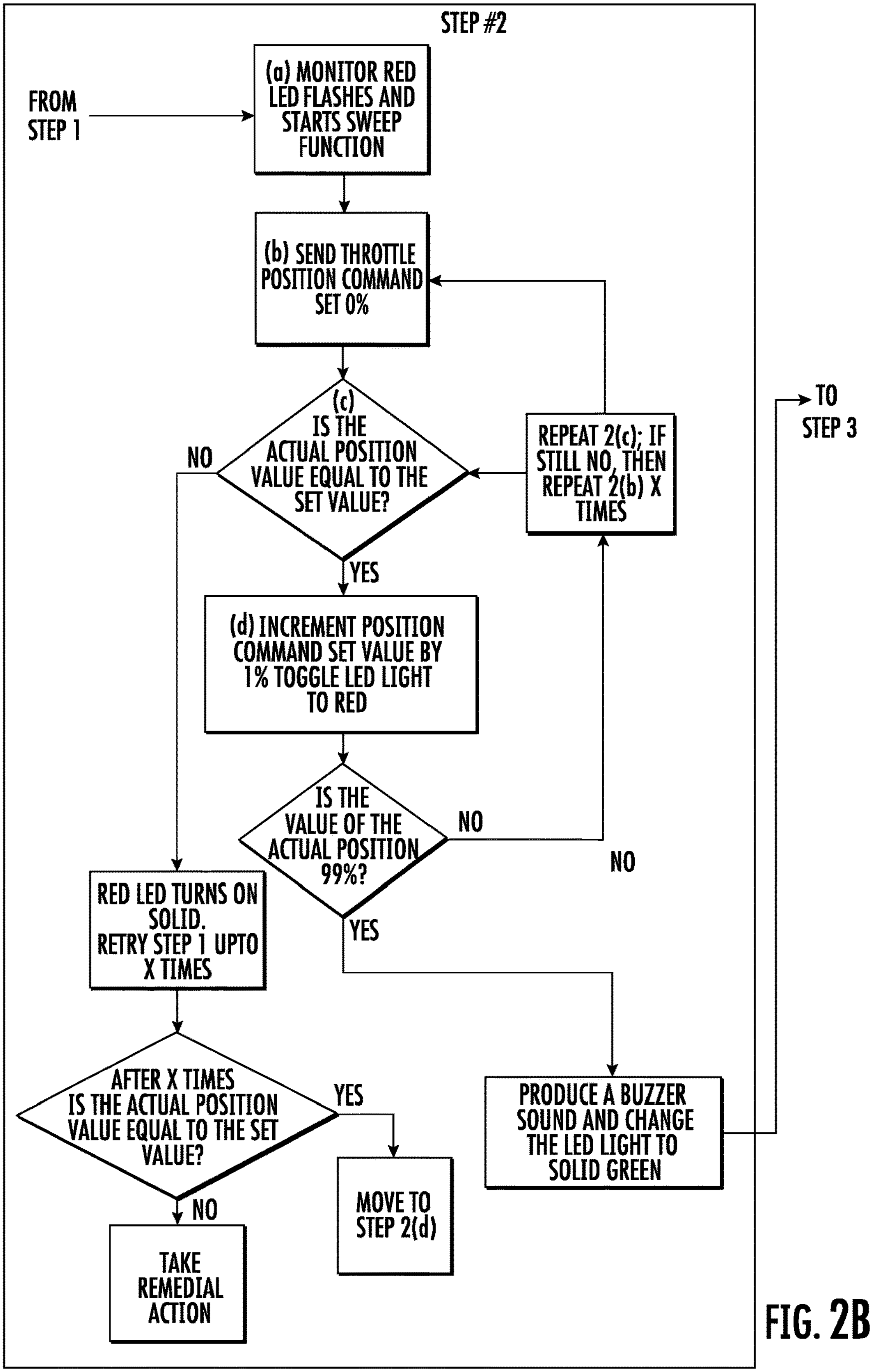
Figure 2C:
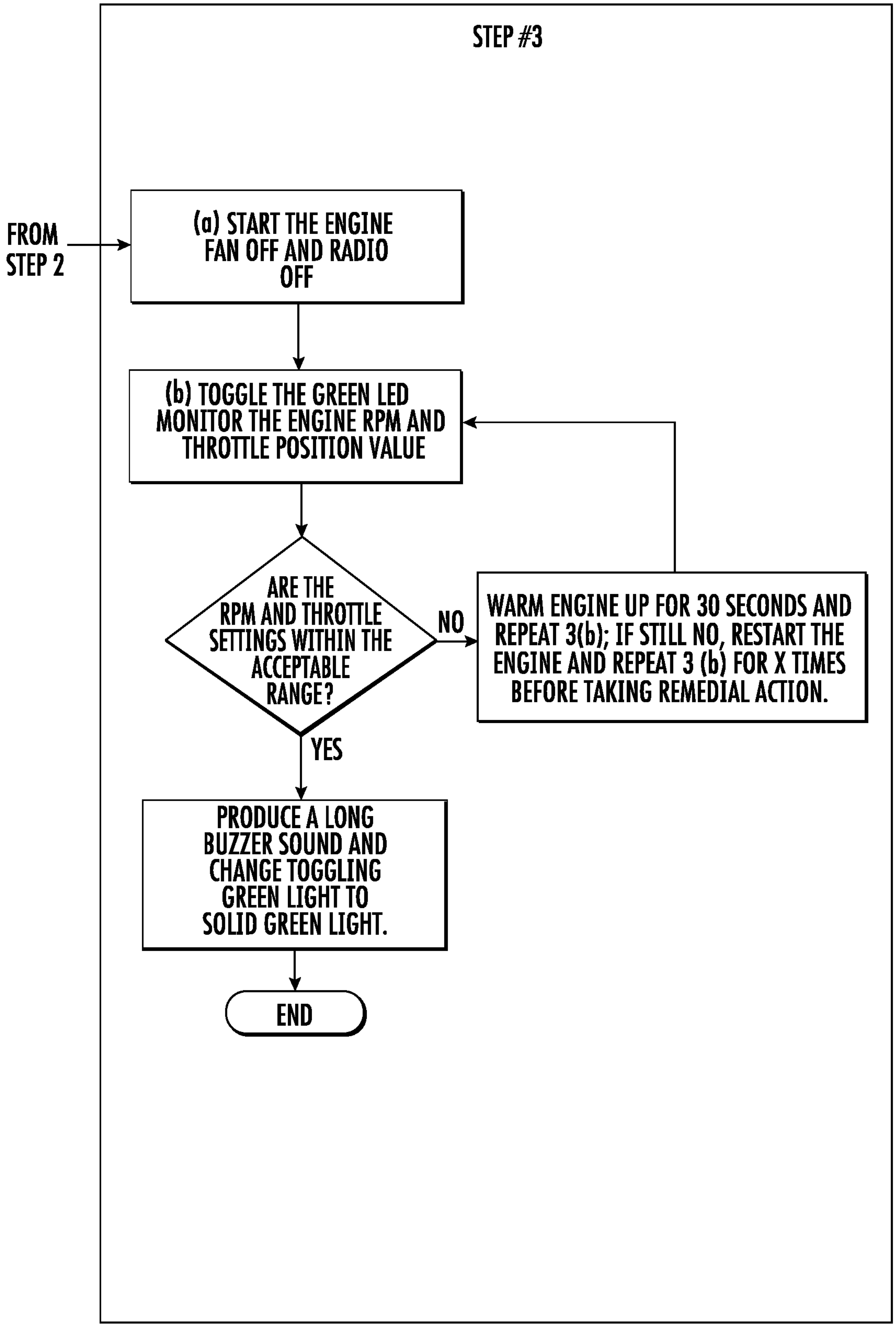

An exemplary sequence for using the throttle body throttle plate programmer is set forth in FIG. 2A-2C. The operational procedure may be summarized as follows. With the air conditioning and fan off, the ignition is turned on without starting the engine. The programming dongle is inserted in the OBD-II port. After approximately 10 seconds of proper preconditions, the buzzer beeps once, the LED flashes red, and a request is sent for the vehicle identification number (VIN).

Once the engine control module (ECM) responses, the VIN number will be stored in memory 401 in communication with the microcontroller 400 of FIG. 1. When the LED flashes red in Step 1 of FIG. 2A, the programming dongle then moves to Step 2, shown in FIG. 2B, and starts the sweep function. As shown in Step 2 at (c), a negative result causes a red LED and signals to retry Step 1 for X times. A continued negative result triggers a message to take remedial action; while a positive results signals to move to Step 2 at (d), where a positive result signals to move to Step 3. In the case of a negative result from Step 2 at (d), there is a signal to retry Step 2 at (b) and, if needed, then retry Step 2 at (b) for X times. Again, any eventual positive result that completes Step 2 will lead to moving to Step 3.

At Step 3, shown in FIG. 2C, there is an additional check of the settings with the engine started and run at an idle. The green LED toggles and the programmer monitors the throttle plate position setting to see if it in an acceptable range, typically the idle is between 400 and 920 rpm and the throttle body plate position has an angular position relative to a zero baseline that is between 4% and 20%. If the idle RPMs and throttle body are in acceptable ranges, they are checked against the manufacturer's preferred ranges for optimization. Once accepted, there is a long buzzer sound and a solid green light to completion of the tests and settings. If the ranges are not acceptable and there is a negative result there are instructions for retrying Step 3 at (b), before taking remedial action.

The type of remedial action depends on what services were performed previously. If the throttle body was replaced, it may be the result of improper installation. If the throttle body was cleaned or repaired, it may be a result of that service or a need for a new throttle body.

A manufacturer's performance settings or standards for one or more vehicles will be loaded in memory 401 for the various checks in FIGS. 2A through 2C. These checks of the settings will indicate acceptable performance or the need for remedial action, and the necessary remedial action may require investigating the manufacturer's troubleshooting guidelines of or other technical literature.

What is claimed is:

1. A dongle for setting a position of a throttle plate in a throttle body, the dongle comprising:

a connector that connects to a vehicle's on-board electronics for interrogation of an engine control module (ECM) to obtain engine revolutions per minute and a throttle plate position within the throttle body;

a microcontroller that generates an acceptable range for engine revolutions per minute and an acceptable range for the throttle plate position within the throttle body;

a comparator that compares extracted information from the interrogation of the engine control monitor to determine if the extracted information is within the acceptable range for engine revolutions per minute and a throttle plate position within a throttle body; and, a signal generator that indicates the presence of an acceptable range or the lack of an acceptable range.

2. The dongle of claim 1, wherein the microcontroller includes a memory with selected manufacturer performance data for at least one vehicle.

3. The dongle of claim 2, wherein the memory has selected manufacturer performance data for a plurality of vehicles.

4. The dongle of claim 1, wherein the signal generator is at least one of a buzzer and is a light emitting diode (LED).

5. The dongle of claim 1, wherein the generated acceptable range for engine revolutions per minute is between 400 and 920 rpm.

6. The dongle of claim 1, wherein the acceptable range for the throttle body plate position is an angular position relative to a zero baseline that is between 4% and 20%.

7. The dongle of claim 1, wherein the signal generator produces a human recognizable signal.

8. The dongle of claim 1, wherein an acceptable range for engine revolutions per minute is between 400 and 920 rpm and an acceptable range for the throttle body plate position is an angular position relative to a zero baseline that is between 4% and 20%.

9. A method for using a dongle to set an engine's revolutions per minute and throttle plate position, the method comprising:

inserting a dongle that includes a microcontroller for generating an acceptable range for engine revolutions per minute and throttle plate position within a throttle body into an on-board diagnostic (OBD)-II connector of a vehicle;

interrogating an engine control module (ECM) through the dongle to extract exiting engine data on revolutions per minute and throttle plate position within the throttle body;

comparing the extracted information from the interrogation of the engine control monitor for engine revolutions per minute and throttle plate position within the throttle body to determine if the extracted information is within the acceptable range for engine revolutions per minute and throttle plate position within the throttle body; and, generating a signal in response to the comparison that indicates either an acceptable range or a lack of an acceptable range.

10. The method of claim 9, wherein the extracted information is converted into a graphic representation of exiting engine data on revolutions per minute and throttle plate position within a throttle body.

11. The method of claim 9, wherein the signal generated in response to the comparison that indicates either an acceptable range or a lack of an acceptable range is human recognizable.

12. A programmer for setting a position of a throttle plate in a throttle body, comprising:

a microcontroller configured to:

receive engine revolutions per minute (RPM) data and a position of the throttle plate within the throttle body from an engine control module (ECM) of a vehicle;

generate an acceptable range for engine RPM and an acceptable range for the throttle plate position;

determine when the received engine RPM data is within the generated acceptable range for engine RPM;

determine when the received throttle plate position is within the generated acceptable range for the throttle plate position; and generate a signal indicative that the received engine RPM data is within the generated acceptable range for engine RPMs and that the received throttle plate position is within the generated acceptable range for the throttle plate position.

13. The programmer of claim 12 wherein the acceptable range for engine RPMs is between 400 and 920 revolutions per minute.

14. The programmer of claim 12, wherein the acceptable range for the throttle body plate position is an angular position relative to a zero baseline that is between 4% and 20%.

15. The programmer of claim 12, wherein the microcontroller includes a memory with selected manufacturer performance data for at least one vehicle.

16. The programmer of claim 15, wherein the memory has selected manufacturer performance data for a plurality of vehicles.

* * * * *